United States Patent
Lovchik et al.

(10) Patent No.: US 11,188,722 B2
(45) Date of Patent: Nov. 30, 2021

(54) MECHANICALLY STAMPED UNIQUE FEATURES FOR AUTHENTICITY AND PROVENANCE TRACKING

(71) Applicant: International Business Machines Corporation, Armonk, NY (US)

(72) Inventors: Robert Dean Lovchik, Schoenenberg (CH); Jonas Weiss, Oberrieden (CH); Yuksel Temiz, Zug (CH); Emmanuel Delamarche, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/826,601

(22) Filed: Mar. 23, 2020

(65) Prior Publication Data

US 2021/0294989 A1   Sep. 23, 2021

(51) Int. Cl.
*G06K 19/06* (2006.01)
*G06K 1/12* (2006.01)

(52) U.S. Cl.
CPC ..................... *G06K 1/12* (2013.01)

(58) Field of Classification Search
CPC .. G06Q 10/087; G06Q 20/341; G06K 9/0002; G06K 9/00013; G06K 19/06037; G06K 7/1417; H04N 1/32144; H04N 2201/3233
USPC ....... 235/375, 379, 380, 382, 385, 487, 494; 705/39, 44
See application file for complete search history.

(56) References Cited

U.S. PATENT DOCUMENTS

| | | | |
|---|---|---|---|
| 10,043,073 B2 | 8/2018 | Ross | |
| 10,320,567 B2 | 6/2019 | Scott | |
| 10,357,990 B2 | 7/2019 | Philippe | |
| 2009/0041993 A1* | 2/2009 | Faris | B33Y 80/00 428/207 |
| 2013/0127959 A1* | 5/2013 | Hanina | G06K 1/121 347/101 |
| 2019/0023055 A1 | 1/2019 | Pantelic | |
| 2019/0034694 A1 | 1/2019 | Ross | |

FOREIGN PATENT DOCUMENTS

| | | |
|---|---|---|
| CN | 1279849 A | 1/2001 |
| CN | 1359095 A | 7/2002 |
| CN | 103198759 A | 7/2013 |
| CN | 106537418 A | 3/2017 |
| CN | 107408319 A | 11/2017 |
| WO | 2018202774 A1 | 11/2018 |

OTHER PUBLICATIONS

International Search Report and Written Opinion, International Application No. PCT/IB2021/051235, International Filing Date Feb. 15, 2021.

* cited by examiner

*Primary Examiner* — Jamara A Franklin
(74) *Attorney, Agent, or Firm* — David B. Woycechowsky

(57) ABSTRACT

Technology for managing objects. A method is applied to a set of objects, for example, in view of commissioning such objects. The method includes patterning a surface of each object of a set of objects to be managed. The patterning is accomplished by using hard particles to make indentations in a surface of each object of the set of object, with the pattern formed on each object being a unique physical fingerprint that can be used to identify the object when performing various manage method(s) on the objects.

25 Claims, 11 Drawing Sheets

(side view)

(bottom view)

73 features 86 features 116 features

MECHANICALLY STAMPED UNIQUE FEATURES FOR AUTHENTICITY AND PROVENANCE TRACKING

BACKGROUND

The invention relates in general to the field of methods of managing objects (for example, methods of commissioning objects), methods of verifying the authenticity of such objects, as well as objects having unique physical features for the purpose of implementing such object management methods.

Assuring the authenticity of products and assets is a fundamental need across industries like electronics, automotive, aerospace, defense, and retail, where there is a risk of causing harm when fake products go unnoticed. Authenticity is notably critical for raw materials, diagnostic tests, electronic components, hardware parts, and finished goods, such as luxury bags and gold bars. A related need is to track and trace the logical and physical route, condition and chain of custody (or ownership) of goods throughout the supply chain and the lifecycle of the assets. Distributed ledgers, including blockchains, have gained attention as a technology that increases trust and visibility along the supply chain for more accurate tracing of goods as well as asserting whether a product is genuine or fake.

SUMMARY

According to a first aspect, the present invention is embodied as a method of managing objects. The method is applied to a set of objects, for example, in view of commissioning such objects. The method essentially relies on patterning a surface of each object of said set of objects. The surface of each object is patterned by first placing an arrangement of hard particles vis-à-vis said surface. The arrangement of hard particles forms an amorphous pattern, that is, the arrangement of particles looks like a random arrangement, deprived of long-range order. Then, a mechanical pressure is applied on the hard particles to transfer this amorphous pattern onto said surface and form a relief pattern for each object. The relief pattern formed is unique and, as such, defines a physical fingerprint of said each object. Such physical fingerprints can thus later be exploited to verify the genuineness of the objects, or to track and trace the logical and physical route, condition, and/or chain of custody (for example, ownership) of the objects throughout the supply chain and their lifecycle.

The present approach makes it possible to easily pattern unique tags, directly on the product, whereby a unique and low-cost physical fingerprint is embossed on the product. Thus, the present scheme allows physical objects to be securely and uniquely identified and tracked, throughout their lifecycle management. Such tags are indeed easy to manufacture, easy to detect, but very difficult to forge or replace. Interestingly, the present physical fingerprints can be detected with existing methods, such as methods relying on smart phone cameras or simple optical readers.

In embodiments, the arrangement of hard particles is provided as part of a support material, wherein the hard particles are affixed to the support material so as to at least partly protrude from the support material, on one side thereof, prior to placing the support material vis-à-vis the surface of said each object. For example, the hard particles may advantageously be provided as part of a sheet of sandpaper. The uniqueness and complexity of the pattern formed by the particles is ensured by the random grit size and location distribution of particles on the sandpaper. Every spot on the paper is only used once but the cost of sandpaper is very low and is available for roll-to-roll processes. The hardness of the grit can be matched to the surfaces to be tagged, if necessary.

In preferred embodiments, the mechanical pressure is applied by stamping the hard particles on the surface of the objects.

Preferably, each object comprises a recessed area. The surface onto which the amorphous pattern is to be transferred is defined in this recessed area. The arrangement of hard particles is placed vis-à-vis the surface in this recessed area, and mechanical pressure is applied so as to transfer the amorphous pattern onto the surface in the recessed area.

In embodiments, the method further comprises, after applying said mechanical pressure, removing residual hard particles from the surface of the object. Preferably, a protective coating is applied on the unique relief pattern formed, so as to protect the physical fingerprint. The applied coating is nevertheless permissive to light, so as to allow optical detection of the physical fingerprint.

In preferred embodiments, the hard particles of the arrangement as placed vis-à-vis said surface are partly colorized. Thus, the hard particles exhibit distinct colors. For example, some particles may exhibit, each, multiple colors, as a result of spraying colors on the arrangement of particles. In variants, some of the particles have a color that differs from colors of other particles. As a result, the relief pattern formed upon applying said mechanical pressure may show a heterogeneous color pattern.

Typically, the relief pattern is optically read (for example, at the manufacturer's site), after having formed the unique relief pattern on each object. This way, a digital fingerprint can be obtained, which corresponds to the physical fingerprint as defined for each object. Next, digital fingerprint data is stored in a database. The digital fingerprint data captures said digital fingerprint. The digital fingerprint data is stored so as to be indexed by a respective identifier of each object.

This way, the genuineness of the objects can easily be verified, for example, by comparing a digital fingerprint as scanned by a user to data stored in the database. For instance, in embodiments, the method further comprises receiving (for example, at a server) a digital fingerprint of a given one of the objects (for example, from a user or a verifier), and verifying a genuineness of said given one of the objects by comparing the digital fingerprint received to digital fingerprint data as stored in said database and indexed by an identifier of said given one of the objects.

According to another aspect, the invention is embodied as a method of verifying a genuineness of an object. This method is performed in respect of a given object as described above, for example, by a user who considers to buy the object or by a verifier. The object comprises a surface patterned with a relief pattern. As explained above, the relief pattern has been formed according to an arrangement of hard particles forming an amorphous pattern, by applying a mechanical pressure on the hard particles to transfer said amorphous pattern onto said surface. As a result, the relief pattern defines a physical fingerprint of the object. The method revolves around optically reading the relief pattern to obtain a digital fingerprint capturing said physical fingerprint and, based on said digital fingerprint, instructing to verify a genuineness of this object.

In preferred embodiments, the method further comprises comparing said digital fingerprint to reference data as previously obtained for said object to verify the genuineness of said object. The comparison can potentially be performed locally (for example, at a computerized device used for optically reading the relief pattern) or remotely. Preferably though, the method further comprises transmitting said digital fingerprint to a remote server, for it to compare said digital fingerprint to said reference data.

In embodiments, the relief pattern is optically read using a computerized device and the method further comprises registering the computerized device with a database in data communication with the server, prior to transmitting said digital fingerprint.

Preferably, the method further comprises identifying features of the relief pattern optically read, whereby the digital fingerprint captures the features detected. The identified features may for instance include relative positions of spots detected in the relief pattern. Various types of features may possibly be extracted from the physical fingerprints and exploited for verifying the objects.

In embodiments, the relief pattern is optically read so as to obtain several images of the relief pattern, whereby the digital fingerprint captures features detected from said several images. The method may notably comprise superimposing said several images to obtain a combined image, whereby the digital fingerprint captures features detected from said combined image. In particular, said several images may be obtained by imaging the relief pattern in different lighting conditions.

In preferred embodiments, the method further comprises scanning a barcode associated to said object to obtain barcode data capturing an identifier of said object, prior to transmitting said digital fingerprint. Such barcode data is transmitted to the server, for the latter to subsequently identify data corresponding to said identifier as said reference data and compare said digital fingerprint to said reference data.

Another aspect of the invention concerns the object itself, that is, an object that comprises a surface patterned with a relief pattern. As discussed above, this pattern has been formed according to an arrangement of hard particles forming an amorphous pattern and by applying a mechanical pressure on the hard particles to transfer said amorphous pattern onto said surface. As a result, the transferred pattern defines a physical fingerprint of the object. The relief pattern is preferably formed by stamping the hard particles on said surface. Preferably, the object comprises a recessed area, said surface is defined in the recessed area, and the relief pattern is formed on the surface within the recessed area. The object preferably comprises a protective coating on the relief pattern, wherein the coating is permissive to light. Moreover, the relief pattern may possibly be partly colorized, so as to exhibit a heterogeneous color pattern.

According to a further aspect of the present invention, a method includes the following operations (not necessarily in the following order): (i) for each given object of a plurality of objects, creating a pattern on at least one surface of each given object with the creation of the pattern including: (a) placing an arrangement of hard particles forming an amorphous pattern adjacent to the at least one surface of the given object, and (b) applying mechanical pressure on the hard particles to transfer said amorphous pattern onto the at least one surface to form indentations in the at least one surface, with the indentations forming a unique relief pattern on the given object; and (ii) managing the plurality of objects based, at least in part, upon the unique relief pattern as a physical fingerprint respectively defining each object of the plurality of objects.

According to a further aspect of the present invention, a method includes the following operations (not necessarily in the following order): (i) imprinting a pattern of small indentations on a first physical object by pressing, against a set of surface(s) of the first physical object, a plurality of hard particulate objects, with the imprinted pattern representing a physical fingerprint; (ii) scanning the pattern to obtain a digital fingerprint corresponding to the physical fingerprint of the first physical object; and (iii) identifying the first physical object by comparing the physical fingerprint imprinted on the first physical object with the digital fingerprint for the first physical object.

According to a further aspect of the present invention, a device, for use with a physical object that defines a first surface, includes: (i) a major surface with a plurality of hard particles protruding therefrom in a random pattern; (ii) a physical object securing sub-assembly; and (iii) a mechanical actuation sub-assembly. The physical object securing sub-assembly is structured, sized and/or shaped to mechanically secure the first physical object. The mechanical actuation sub-assembly is structured, sized and/or shaped to cause the major surface with the plurality of hard particles protruding therefrom and the first surface of the physical object to move relative to each other into a position of physical interference so that a physical fingerprint pattern corresponding to the random pattern of hard particles is imprinted on the first surface.

According to a further aspect of the present invention, there is a method, computer program product (CPP) and/or computer system performing the following operations not necessarily in the following order: (a) receiving a plurality of digital fingerprint data sets, with each given digital fingerprint data set including information indicative of: (i) an identity of a respectively corresponding physical object that defines a first set of physical surface(s), and (ii) a digital fingerprint indicative of a geometry of a pattern of small indentations imprinted on the set of surface(s) of the respectively corresponding physical object; (b) receiving a scan data set including information indicative of a scan of a first set of surface(s) of a first physical object, with the scan indicating a geometry of a pattern of small indentations imprinted into the first set of surface(s); (c) comparing the scan data set to the plurality of digital fingerprint data sets to determine that the first physical object matches a matching digital fingerprint data set of the plurality of digital fingerprint data sets; and (d) communicating a communication that indicates that the first physical object has an identity corresponding to the identity indicated in the matching digital fingerprint data set.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIGS. 1-5 show sequences illustrating steps of mechanically stamping a surface of an object with amorphous arrangements of hard particles (for example, provided as part of sandpaper), to form a relief pattern defining a physical fingerprint of this object, as involved in various embodiments of the invention;

FIG. 6 is a sequence illustrating steps of applying a transparent protective coating on a relief pattern formed on a surface defined in a recessed area of the object, as in embodiments;

FIG. 7 is another sequence illustrating steps of colorizing hard particles the sandpaper, so as for the relief pattern formed to have a heterogeneous color pattern, as in embodiments;

FIG. 8 shows features that can be extracted by imaging the relief pattern. FIG. 8A is a photograph of such a relief pattern (viewed from the top) and FIG. 8B shows corresponding features as obtained by processing an image such as shown in FIG. 8A, as involved in embodiments;

FIG. 9 shows a portable, optical reader device, which comprises a light-emitting diode (LED) ring, as involved in embodiments. FIG. 9A is 2D cross-sectional view of the device. FIG. 9B is a bottom view of the device;

FIGS. 10A-10C show features as extracted from images obtained under different illumination conditions (with different wavelengths), as involved in embodiments;

FIG. 13 shows selected steps performed by components and entities as identified in FIG. 11.

Figure 1A:
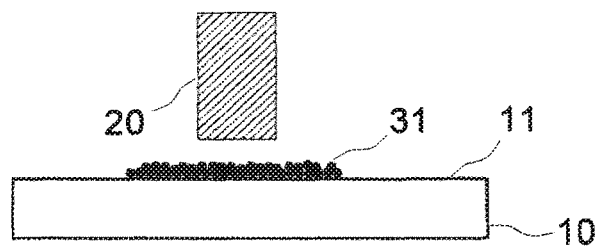
FIG. 1A shows a first embodiment of the present invention during a first manufacturing operation.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

Some embodiments of the present invention may be directed to objects having mechanically stamped unique features, which form a physical fingerprint for this object.

Some embodiments of the present invention may recognize one or more of the following problems, shortcomings, understandings and/or opportunities for improvement with respect to the current state of the art: (i) a blockchain or any other digital track-and-trace solution alone, is often not sufficient to prove originality or provide an uninterrupted chain of custody in supply chains and throughout the product lifecycle; (ii) typically, an object is linked to a digital record by a unique identifier (UID) that represents either the individual object or a class of objects by model, batch, production site, manufacturer or similar; (iii) the UID is typically printed, embossed, or attached as a tag to the object or its packaging; (iv) many of these identifiers can be easily copied or transferred to a clone of the object; (v) an identifier alone can usually not uniquely and securely identify a physical object, that is, authenticate an object; (vi) various methods exist to tag an object (for example, laser engraving, holographic stickers, 1D and 2D barcodes, mechanical/rupture seals, serial numbers, logos, etc.); (vii) predominant verification methods rely on optical, radio-frequency identification (RFID), or electric readout techniques, or still involve visual reading of serial numbers; (viii) such tags are easy to fabricate and verify, and they are also relatively easy to copy or forge (for example, punched serial numbers and other similar tags can easily be faked by grinding and re-punching a new tag, and laser-engraved security tags can potentially be copied too); (ix) sticker-based security tags are not suitable for products exposed to harsh environments;

(x) more sophisticated technologies have therefore been proposed, which for instance rely on isotope tracking, chemical fingerprints, or DNA fingerprints; and/or (xi) such technologies, however, can be either too expensive or too complex to implement.

In reference to FIGS. 1-5, and 12-14, a first aspect of the invention is described, which concerns a method of managing objects. Note, this method and its variants, as well as the method related to a second aspect of the invention (as well as its variants), are collectively referred to as "the present methods" in this document. All reference numerals with a prefix of a capital S refer to methods steps of the flowcharts of FIGS. 13 and 14, while numeral references pertain to components and entities involved in the present methods.

The first aspect of the invention essentially relies on patterning a surface 11 of each object 10 of a set of objects, to ease the subsequent management of such objects, for example, in view of tracking the authenticity, the ownership, and/or the provenance of such objects. This method may, for example, be performed in view of, or for the purpose of, commissioning such objects. In the present context, "commissioning objects" means readying these objects for their lifecycle management. The commissioning phase can also be regarded as a preparatory step to bring such objects into working condition or to market such objects. Typically, batches of numerous, similar objects need be commissioned at the same time by manufacturers. Thus, the commissioning phase typically deals with sets of objects.

In the following, the methods concerning the first aspect of the invention are nevertheless described in reference to a single object, it being understood that the same or similar methods are performed in respect of each of the other objects of the set. The surface 11 of an object 10 is patterned as follows.

First, an arrangement of hard particles 31-33 is placed S3 vis-à-vis the surface 11, for example, directly on the surface (as in FIG. 1) or above the surface to be patterned (as in FIGS. 2-5). The arrangement of hard particles 31-33 may for instance be essentially two-dimensional (2D). It typically consists of a single layer of particles (as assumed in FIGS. 2-5). In variants, a few layers of particles may be disposed on or above the surface 11, as in FIG. 1. In all cases, the particles form an amorphous pattern. An amorphous pattern lacks the long-range order that is characteristic of an ordered structure such as a lattice or a crystal. The amorphous pattern implies a non-deterministic arrangement of the particles, which looks like a random arrangement of particles. The arrangement of hard particles 31-33 may for example be provided as (a portion of) a sheet of sandpaper. The particles may otherwise be partly integrated in (or on) a support material (for example, a matrix material), as discussed later.

Next, mechanical pressure is applied S5 on the hard particles 31-33 to transfer the amorphous pattern onto the surface 11 of the object 10. This way, a unique relief pattern 40, 41-43 is formed, for each object 10 of the set. The pattern is unique, inasmuch as the amorphous pattern differs from one of the object to the others, owing to the non-deterministic, random-like arrangements of hard particles used to pattern the objects. The unique relief patterns obtained accordingly define physical fingerprints for the patterned objects 10, which can be later exploited to authenticate the objects, if needed.

Note, the particles involved are hard particles, meaning they should be sufficiently hard to withstand the mechanical pressure applied, for example, a stamping process, and to transfer the pattern into the object surface 11 in order to give rise to a relief pattern 40, 41-43. In other words, the objects 10 involved must have a sufficiently thick and ductile surface 11 to yield a readable pattern. The particles will normally be harder than the surface, though this is not necessarily strictly required.

The present approach makes it possible to easily pattern unique tags, directly on the product, whereby a unique and low-cost physical fingerprint is embossed on the product. The obtained tags can be regarded as physical unclonable functions, from which digital fingerprints (DFPs) can be obtained. To that aim, a relief pattern can be optically read (scanned) to generate a respective DFP. Each DFP can then be used to verify the genuineness of the respective object.

Each DFP is impacted by the unique physical property (or a set of unique properties) conferred by the physical fingerprint (that is, the relief pattern) of each object. A DFP may for instance be a vector (for example, a feature vector), which may possibly be reduced to a single number, a string, or any combination of characters (possibly including digits and other characters). More generally, a DFP can be a dataset that reflects the unique property (or a set of unique properties) of the relief pattern. The DFP may also be a mere image (for example, a pixel image) of the relief pattern.

The DFPs can be paired to identifiers of the objects (for example, unique identifiers, or UIDs). Once paired with such identifiers, the DFPs form crypto-anchors, tying each UID with a unique physical property (or a set of unique properties) of the object that is difficult to clone, forge, and/or transfer to another object. The authenticity of this association may possibly be ensured by a cryptographic signature, if necessary.

Thus, the present scheme allows physical objects to be securely and uniquely identified, and tracked, throughout their lifecycle management. The patterning of the objects is typically carried out at the manufacturer's place, denoted by numeral reference 100 in the accompanying drawings.

Notwithstanding the ease with which they can be obtained, the present physical fingerprints raise barriers against counterfeiting. Such tags are indeed easy to manufacture, easy to detect, but very difficult to forge or replace. Features that can be part of the product itself, rather than only on the package, which could easily be re-used by a malicious actor. Advantageously, the proposed physical fingerprints can be detected with existing methods, such as methods relying on smart phone cameras or simple optical readers, as discussed later. Features extracted from such physical fingerprints may further have a high dimensionality (in a machine learning sense), making them very difficult, or even impossible, to copy.

All this is now described in detail, in reference to particular embodiments of the invention. To start with, preferred patterning methods are discussed. In embodiments, the arrangement of hard particles is provided S1 as part of a support material 32, prior to placing this support material 32 vis-à-vis the surface 11 of the object 10 (and prior to applying pressure onto the material 32), as seen in FIGS. 2, 4, 5, and 7. That is, hard particles 31-33 may be affixed to a support material 32 (or trapped in a matrix material), so as to at least partly protrude from this support material 32, over at least on one side (or "major surface") thereof. The particles may, for example, be trapped in a thin, flexible sheet of polymer.

Preferably though, the hard particles are provided S1 as part of a sheet of sandpaper 32, or a portion thereof. Sandpaper (also called glasspaper) comprises abrasive material glued to one face of the paper. The abrasive material is formed by hard particles (grit particles), for example, of glass, aluminum oxide, silicon carbide, diamond, etc. The average diameters of the particles is typically between 5 and 2,000 microns. Preferably, the average diameter of the particles is between 10 and 500 microns. The particles are preferably glued to one face only of the sandpaper, as assumed in FIGS. 2, 4, 5, and 7. The uniqueness of the pattern formed by the particles and its complexity is ensured by the random grit size and location distribution of particles on the paper. Every spot on the paper is meant to be used only once. The cost of sandpaper is very low and is available for roll-to-roll processing, as illustrated in FIG. 4. The hardness of the grit can be matched to the surfaces to be tagged, as necessary.

Figure 4A:
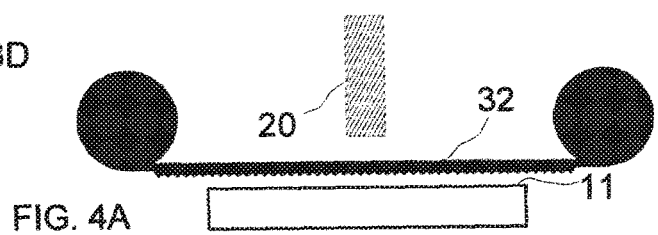
FIG. 4A shows a fourth embodiment of the present invention during a first manufacturing operation.
Figure 4B:
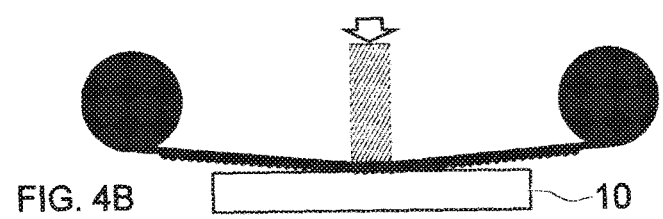
FIG. 4B shows the fourth embodiment during a second manufacturing operation.
Figure 4C:
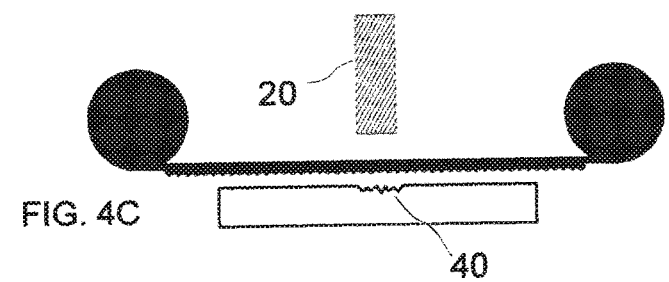
FIG. 4C shows the fourth embodiment during a third manufacturing operation.

As illustrated in FIGS. 1-5, and 7, mechanical pressure is much preferably applied S5 by stamping the hard particles 31-33 on the object surface 11. For example, sandpaper can be outstretched between the surface 11 of the object 10 to be patterned and a stamp 20, prior to stamp a portion of the sandpaper 32 on the surface 11, as depicted in FIGS. 2, 4, 5, and 7. As illustrated in FIG. 4, sandpaper may possibly be outstretched using an unwinding unit and a winding unit, on each side of a supporting unit (not shown). The flexible substrate 32 moves from the unwinding unit to the winding unit. After stamping a given portion of the sandpaper on a given object (FIG. 4B, 4C), the patterned object is removed, another object is put in position, and the sandpaper is slightly unwound (and rewound) to provide a new, clean portion of sandpaper, ready for another stamping step (FIG. 4A).

Figure 1B:
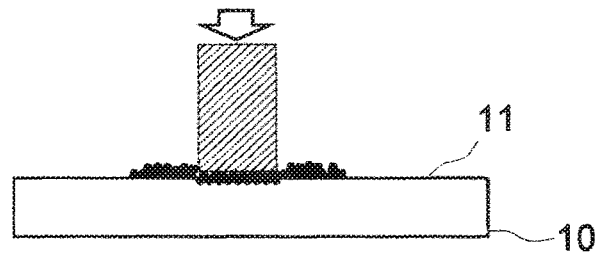
FIG. 1B shows the first embodiment during a second manufacturing operation.
Figure 1C:
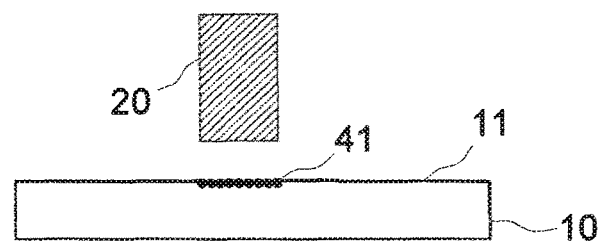
FIG. 1C shows the first embodiment during a third manufacturing operation.
Figure 2A:
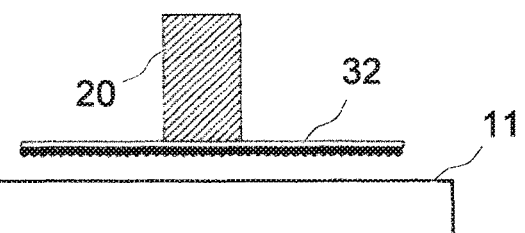
FIG. 2A shows a second embodiment of the present invention during a first manufacturing operation.
Figure 2B:
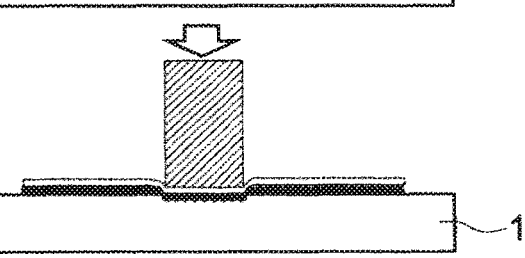
FIG. 2B shows the second embodiment during a second manufacturing operation.
Figure 2C:
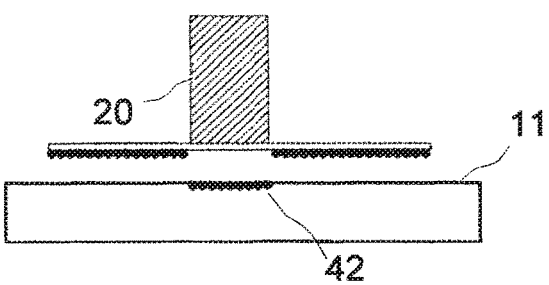
FIG. 2C shows the second embodiment during a third manufacturing operation.
Figure 3A:
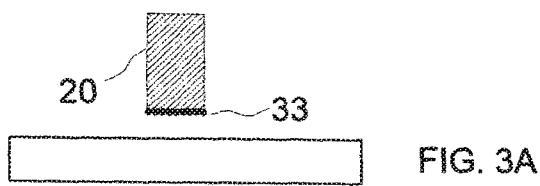
FIG. 3A shows a third embodiment of the present invention during a first manufacturing operation.
Figure 3B:
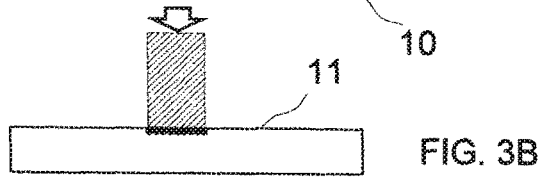
FIG. 3B shows the third embodiment during a second manufacturing operation.
Figure 3C:
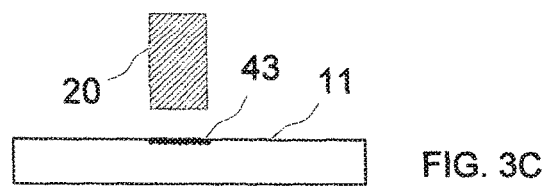
FIG. 3C shows the third embodiment during a third manufacturing operation.
Figure 3D:
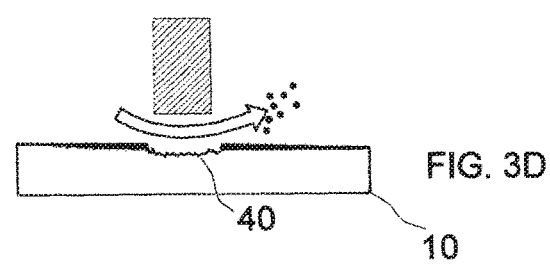
FIG. 3D shows the third embodiment during a fourth manufacturing operation.

Note, the support material 32 may initially rest in an intermediate position between the stamp 20 (as in its resting position) and the surface 11, as assumed in FIG. 4. In variants, the support material 32 may initially be urged against the stamp 20, or be jointly moved therewith, vertically (as in FIG. 2). In other variants, the arrangement of hard particles 33 may form part of the stamp itself, as in FIG. 3, where particles 33 are arranged at an end surface of the stamp (particles may for instance be glued on the end surface of the stamp). In that case, stamps are only used once, or different portions of the stamp surface are used for stamping. In other variants, the support material 32 is stretched directly out on the object 10, for example, on surfaces like surface 11 of the object or on lateral, protruding surfaces of the object 10 (FIG. 5), which surround a recessed area 12 of the object, in which the surface 11 to be patterned is defined. In still other variants, the hard particles 31 are freely disposed on the surface 11 to be patterned, prior to applying mechanical pressure thereon (FIG. 1). For example, the grit material may simply be poured or spread onto the product surface 11.

The stamp may possibly be a handheld device, this depending on the hardness of the material to be embossed. In likely applications, however, an apparatus will be needed, which includes a punching mechanism, or a hydraulic press, for example, in order to achieve a pressure sufficient for embossing the target material. For example, pressures up to 20 tons/cm$^2$, or more, may need to be achieved. The actual pressure used will depend on the material of the support, substrate, or housing of the object that is patterned. Such materials will typically include polymers (plastics) or metals (for example, aluminum, steel). For instance, the pressures used may be of 50 to 1,000 kg/cm$^2$ for plastics, of 200 to 5,000 kg/cm$^2$ for aluminum, and of 1,000 to 20 000 kg/cm$^2$ for steel.

In some embodiments, mechanical pressure is applied on hard particles that are arranged according to an amorphous pattern, whereby this pattern is transferred to the surface 11 of the object. If necessary, a thermal process can be involved, in addition to the mechanical process. For example, the surface 11 of the object may be heated, prior to and while applying the mechanical pressure. In variants, or in addition, the grit may be heated, for example, for generating a pattern on a glass surface or other, similar materials. For example, small metallic particles may be heated using high-frequency induction.

Several additional variants can be contemplated. For example, the grit particles may, in some cases, be physically transferred (at least partly) to the surface 11 of the substrate 10. In that respect, in the accompanying drawings, the numeral reference 40 pertains to the sole relief pattern obtained, whereas references 41-43 denote the relief pattern together with residual particles thereon. Thus, hard particles may form part of the resulting pattern. However, where it is desired to subsequently exploit a relief pattern 40 that is free of residual particles, one may want to remove S7 residual hard particles 31-33 from the patterned surface 11, for example, by flushing residual particles, as depicted in FIG. 3 (see FIG. 3C). Simple cleaning processes may be involved, such as air-based or water-based washing processes. In variants, residual particles may be dissolved in a solvent or etched, for example.

Figure 5A:
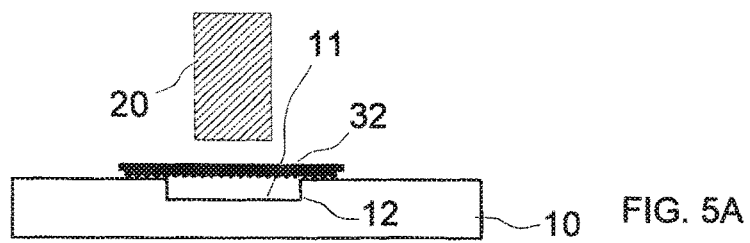
FIG. 5A shows a fifth embodiment of the present invention during a first manufacturing operation.
Figure 5B:
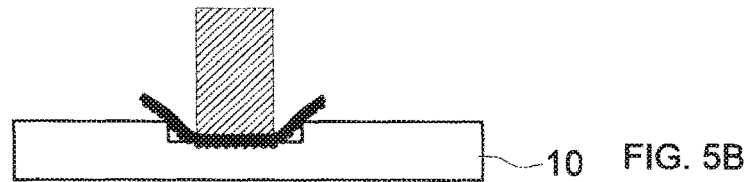
FIG. 5B shows the fifth embodiment during a second manufacturing operation.
Figure 5C:
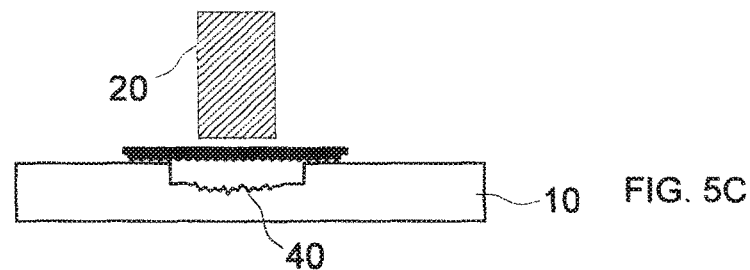
FIG. 5C shows the fifth embodiment during a third manufacturing operation.
Figure 6A:
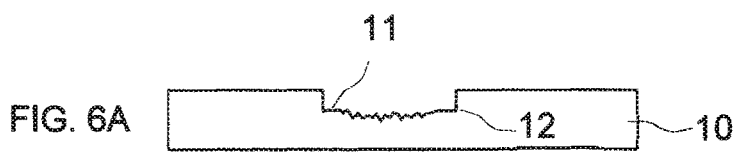
FIG. 6A shows a sixth embodiment of the present invention during a first manufacturing operation.
Figure 6B:
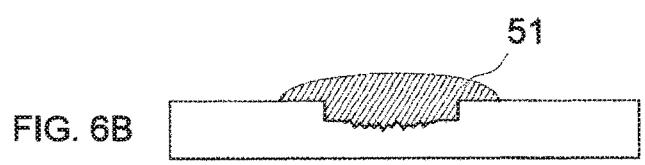
FIG. 6B shows the sixth embodiment during a second manufacturing operation.
Figure 6C:
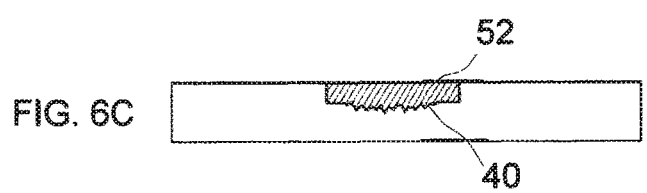
FIG. 6C shows the sixth embodiment during a third manufacturing operation.
Figure 7A:
FIG. 7A shows a seventh embodiment of the present invention during a first manufacturing operation.
Figure 7B:
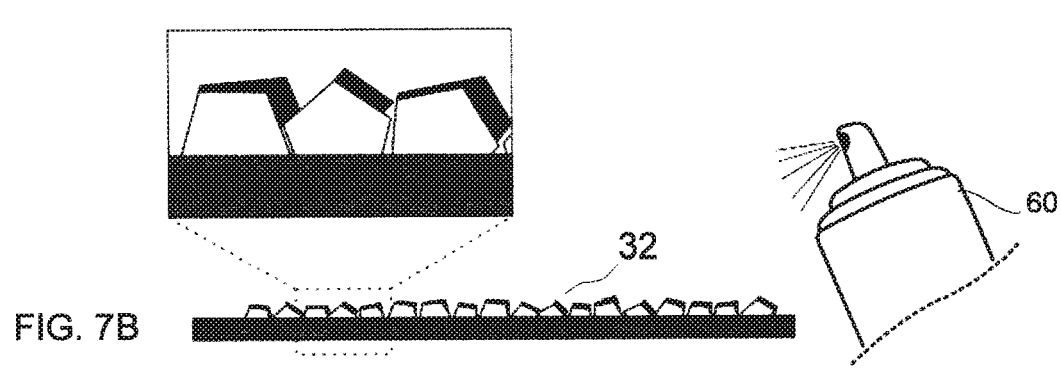
FIG. 7B shows the seventh embodiment during a second manufacturing operation.
Figure 7C:
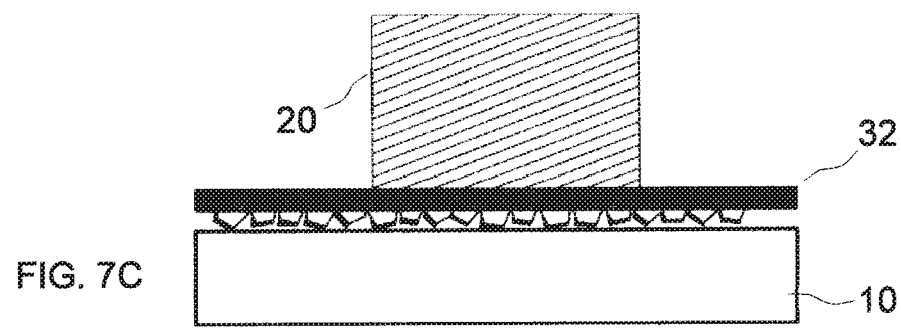
FIG. 7C shows the seventh embodiment during a third manufacturing operation.
Figure 7D:
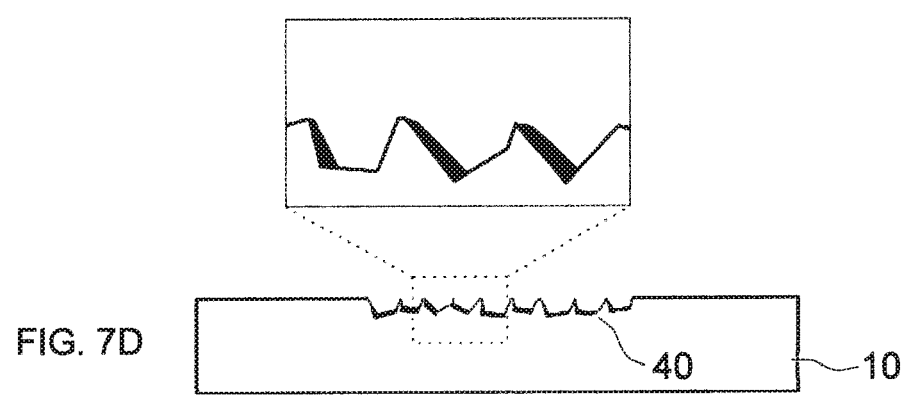
FIG. 7D shows the seventh embodiment during a fourth manufacturing operation.

As evoked above, the embossing may possibly be performed in a recessed area 12 of the product 10, in order to achieve a better physical protection of the transferred pattern. This is illustrated in FIGS. 5 and 6, where the object 10 comprises a recessed area 12, in which the surface 11 is defined. There, the arrangement of hard particles 31-33 is placed S3 vis-à-vis the surface 11 in this recessed area 12, and mechanical pressure is applied S5 so as to transfer the amorphous pattern onto the surface 11, within the recessed area 12.

As further illustrated in FIG. 6, a protective coating 51, 52 may possibly be applied S9 on the relief pattern 40, 41-43. For example, a coating material 51 is first poured onto the pattern surface 11 in the recessed area 12, prior to wiping off excess material, in order to obtain a clean protective layer 52. The material 52 can be subsequently cured, or dried. The relief pattern can for example be protected by a transparent resin or any other suitable type of coating. This material may possibly be applied on a pattern 40 free of residual particles, or onto a pattern 41-43 comprising residual (for example, transferred) particles. Thus, residual particles could be trapped in the protective coating 52, for example, to accentuate features of the pattern 40. In all cases, the applied coating needs to be sufficiently permissive to light, to enable optical detection of the pattern trapped under the protective coating 52.

Additional complexity for the pattern 40 can be achieved by adding a color component. As illustrated in FIG. 7, the hard particles 32 may possibly be partly colorized, so as for the hard particles to exhibit distinct colors. As a result of applying S5 mechanical pressure, the relief pattern 40, 41-43 eventually obtained may have a heterogeneous color pattern. Hard particles may for example be colorized by non-uniformly spraying color onto the sandpaper 32 (see FIG. 7B at reference numeral 60), at an angle therewith (for example, parallel to the average plane of the sandpaper rather than perpendicularly to it), to generate an inhomogeneous color coating. That is, only the exposed sides of the hard particles 31-33 may happen to be colorized. The sprayed color may then transfer to the surface 11, on the relief pattern, upon applying mechanical pressure on the sandpaper. In variants, particles of different colors may be provided on the support material, again resulting in a particolored surface.

Figure 13:
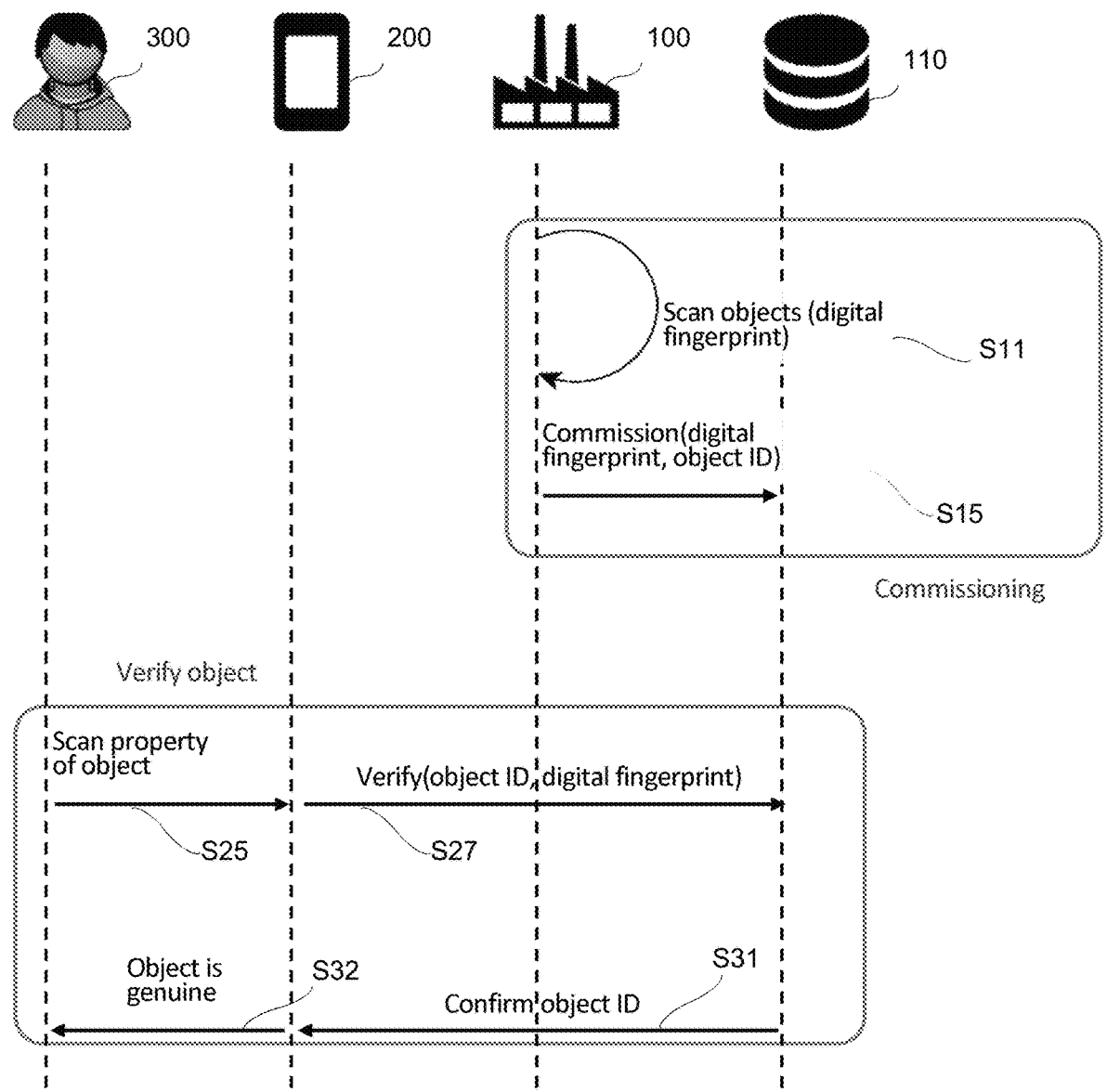
FIG. 13 is a flowchart illustrating high-level steps of a method of managing physical objects, according to embodiments, and more specifically.
Figure 14:
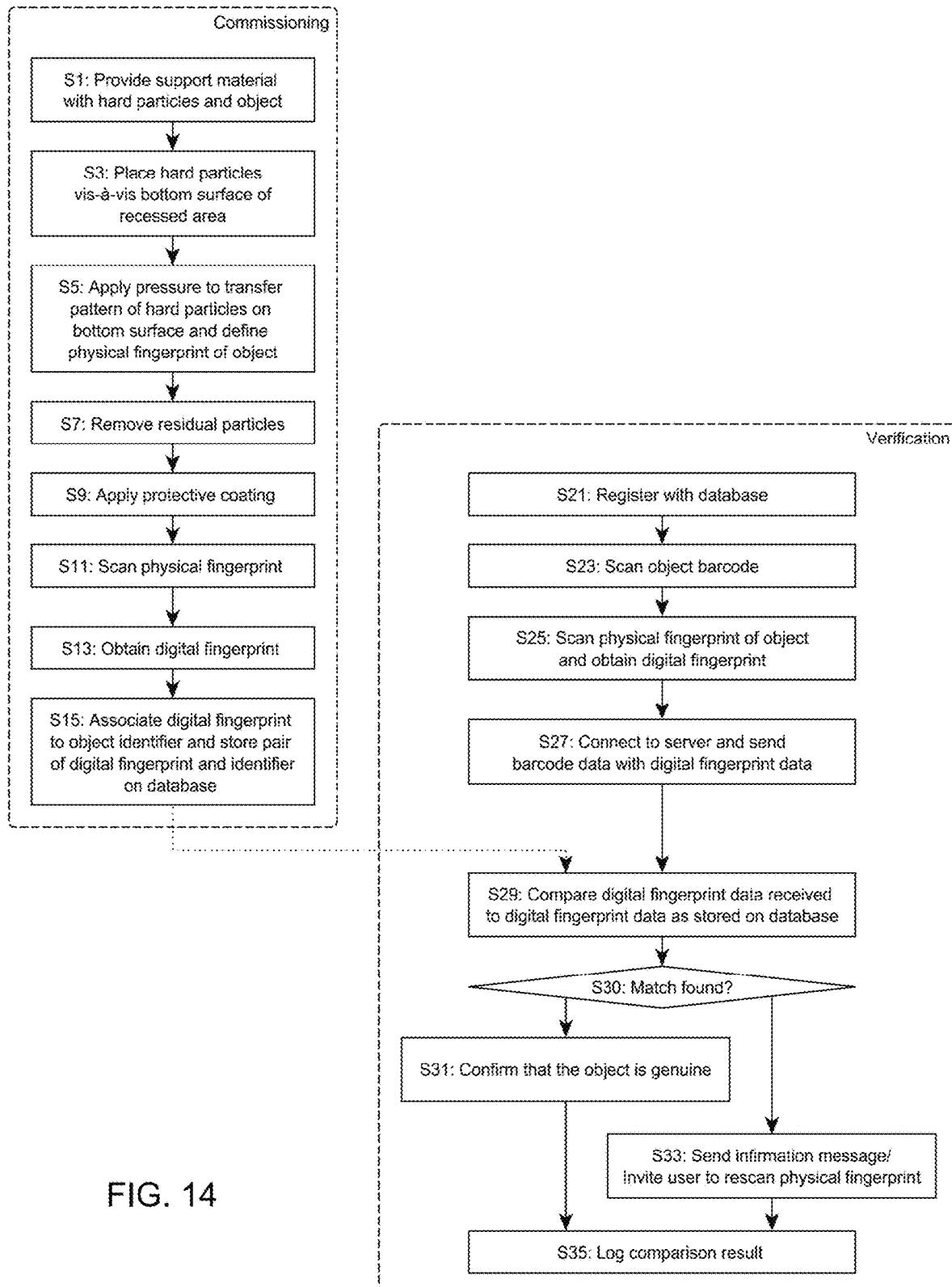
FIG. 14 is a standard flowchart illustrating detailed steps as involved in embodiments of the present methods.

The following discusses preferred ways of commissioning the objects, by exploiting digital fingerprints (DFPs)

derived from the physical fingerprints obtained for each object, see FIGS. 13 and 14. Namely, after having formed S5 a unique relief pattern 40, 41-43, the present methods may further comprise, for each object 10, a step of optically reading S11 the relief pattern formed, in view of obtaining S13 a corresponding DFP. Then, one may instruct to store S15 corresponding DFP data in a database 110, for example, in view of future verification steps. Each DFP is obtained from a respective relief pattern (of a respective object 10) and can thus be regarded as a digital counterpart of its corresponding physical fingerprint.

Figure 11:
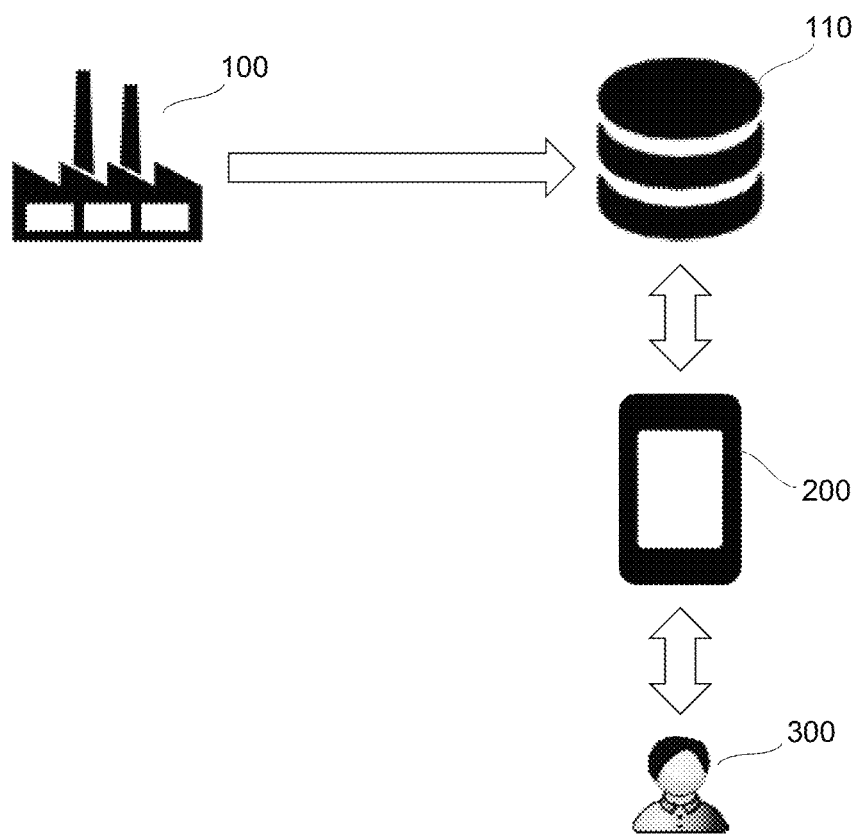
FIG. 11 depicts selected components and entities interacting to commission and verify objects, as involved in embodiments.

DFP data is then stored S15 in a database 110, where it is preferably indexed by respective identifiers 16 of the objects 10. The above steps may again typically be performed at the manufacturer's location, under control of the manufacturer 100 of the objects, see FIGS. 11 and 12.

Step S11 may for example by carried out thanks to a suitably configured optical device or apparatus, which typically makes use of dedicated software. The latter may typically exploit computer vision and image processing techniques to glean information digitally by optically scanning the physical fingerprint 40, 41-43 of the object 10. Note, the manufacturer may likely want to use optical devices that provide results that are as close as possible to results as subsequently obtained by the users or verifiers, to verify the genuineness of the goods. Thus, the manufacturer may use setups involving mere smartphones or tablets, with suitably programmed applications installed thereon.

Storing pairs of object identifiers and DFPs allows the genuineness of the objects to be easily verified, subsequently. This further allows the objects to be tracked, if necessary. Various scenarios can be contemplated. In a first scenario, the database 110 is a trusted backend. Because the verification database 110 is a trusted backend, it is trusted that the identifiers of the objects and their associated DFPs cannot be forged. In variants, the database 110 is implemented as a shared ledger, for example, a blockchain whose integrity is ensured by smart contracts and other security mechanisms. In that case, the pairs of UIDs and DFPs would likely be stored in an encrypted form, and be cryptographically signed. Thus, the database 110 can either be a database controlled and protected by a trusted entity (for example, by the manufacturer) and, therefore, trusted, or a shared ledger. In other variants, two databases may be involved, including a trusted database and a shared ledger.

A blockchain is an attractive back-end platform in the present context as it is distributed, immutable, can be highly available and can, if suitably set up, be independent of object manufacturers and vendors. In variants to blockchains, a central database may be used. However, a central database might be subject to attacks and a single point of failure, not least if the manufacturer goes out of business. Thus, transactions can advantageously be stored in a blockchain, where distribution and consensus algorithms improve the robustness against failure and fraud.

The database 110 is nevertheless assumed to be a central database in the following, for the sake of simplicity. The database 110 (or a server communicating therewith) may receive S27 a verification request (for example, from a user 300 or a verifier), which includes a DFP of a given object 10. In such cases, the database (or server) may proceed to verify S29-S30 the genuineness of this object by comparing S29 the DFP received to DFP data as stored in the database 110. The request may further contain an identifier of this object, to ease the comparison with DFPs as stored in the database 110, given that such DFPs are likely indexed by identifiers 16 the objects in the database 110.

All this is now described in detail, in reference to another aspect of the invention, which concerns a method of verifying the genuineness of an object, be it to verify the authenticity of the object (for example, when buying this object), or track this object or its provenance, etc. Such methods are primarily discussed in respect of FIGS. 13 and 14.

The present verification methods involve an object 10 such as described earlier, that is, with a surface 11 patterned with a relief pattern 40, 41-43. As already explained, this pattern has been formed S3-S9 according to an arrangement of hard particles 31-33 forming an amorphous pattern, by applying S5 a mechanical pressure on the hard particles 31-33 to transfer the amorphous pattern onto a surface 11 of the object. The relief pattern 40, 41-43 accordingly defines a physical fingerprint 40, 41-43 of the object 10. In this context, one assumes that DFPs corresponding to physical fingerprints of the objects have already been stored in a database 110, for example, by the manufacturer of the objects.

The verification methods rely on optically reading S25 the relief pattern 40, 41-43 of a given one of the objects as initially patterned S3-S9 (for example, by a manufacturer 100). Just like step S11, step S25 allows a DFP to be obtained, where this DFP again captures a physical fingerprint 40, 41-43 of the object. Next, the methods instruct S27 to verify S29-S30 the genuineness of this object 10, based on said DFP.

Step S25 is typically performed by a user 300, or a verifier, that is, a person who wishes to inquire about the authenticity of the object 10. Again, a suitable optical reader need be used, for example a smartphone 200 or any optical device, for example, a dedicated optical reader equipped with suitable application software. The means used to perform step S25 should be consistent with that used at step S11, in order to allow a consistent verification process.

This verification process may be essentially performed locally, for example, using the same device 200 as used to optically read S25 the relief pattern, or another device in data communication with the device 200. Thus, the DFP may be stored in a memory of the device 200 (though it may be sufficient to store the DFP in the main memory of this device), for verification purposes. The verification process may for example be based on data previously provided by a remote server.

In variants, the device may connect to a remote server 110, in view of performing the verification. In that respect, the present methods may further comprise transmitting S27 the DFP to a remote server 110, for it to compare S29 said DFP to reference data 46. The following description assumes that the device 200 connects to a remote server, which is in data communication with the database 110. That is, the server and the database may possibly form part of a same computerized entity, although the database 110 may possibly be maintained independently from the manufacturer, as noted earlier. Note, in practice, the protocol used may possibly require to register S21 the computerized device 200 (as used to optically read S25 the relief pattern 40, 41-43 and/or perform the comparison S29) with the database 110, prior to transmitting S27 the DFP obtained at step S25.

In all cases, the verification process may compare S30 the DFP as obtained at step S25 to reference data 46 as previously obtained S11 (for example, by the manufacturer 100) for that same object 10, in order to verify, at steps S31, in FIG. 14, and at step S32, of FIG. 13, the genuineness of this object 10. The server 110 may then send S31 a confirmation 110 that the object 10 is a genuine object, should a match be found, see FIG. 13 or 14 (see step S35 in FIG. 14). A standard error message may be sent S33 if no match were found, for example, inviting the buyer to retry and rescan the DFP, for example. In all cases, comparison results may possibly be logged, for example, to track both succeeded and failed attempts to authenticate objects.

What do the DFPs typically contain, how can they be compared? The physical fingerprints of the objects can for example be imaged, so as to obtain pixel images of the relief patterns, whereby the resulting images can be directly compared, using any suitable image comparison technique, for example, based on histogram comparisons, earth mover distance, etc. Thus, the DFPs may simply consist of images of the relief patterns. Preferred embodiments, however, rely on features extracted from the images, using dedicated application software. For instance, each of steps S11 and S25 may comprise a step of identifying S25 features of the relief pattern 40, 41-43 as optically read, so as for the resulting DFPs to capture or reflect the features identified. The identified features may notably include relative positions of spots detected in the relief pattern 40, 41-43, as illustrated in FIG. 8.

Figure 8A:
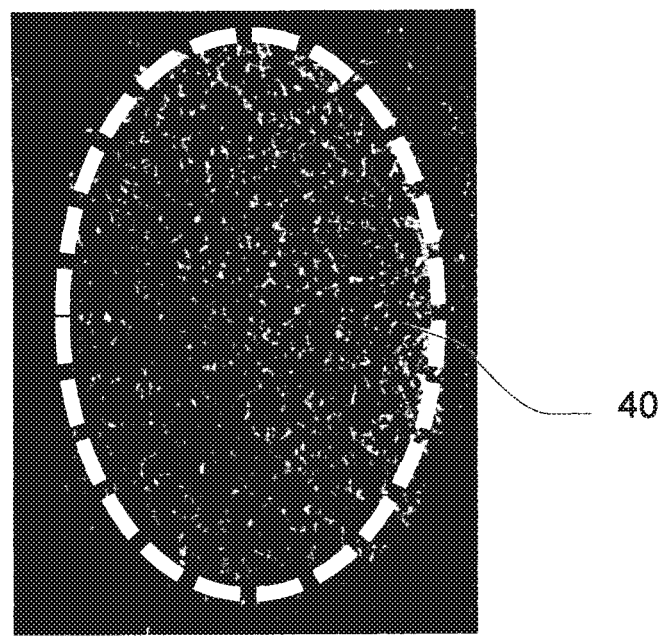
FIG. 8A shows a portion of an eighth embodiment of the present invention.
Figure 8B:
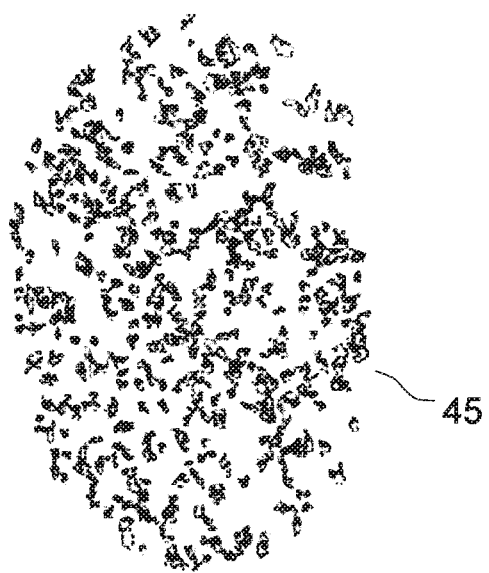
FIG. 8B shows an image taken of a portion of the eight embodiment.

In detail, FIG. 8A shows a photograph of a given relief pattern as obtained according to embodiments discussed earlier. Namely, a relief pattern was stamped in a recessed area of a given object, which was milled from aluminum; the depth of the recessed area is 0.25 mm in this example. An embossing pressure of five tons was used. FIG. 8B shows a processed image of the oval area 45 detected in FIG. 8A, which emphasize spots of thresholded intensities. Note, deterministic features (for example, fiducial markers) may additionally be detected to correctly orientate the image/pattern (as routinely done for 2D barcodes), and for focusing the images. And beyond the sole relative positions of the spots detected, other features may possibly be detected or computed based on the features detected, such as the average density of the spots retained, as well as other intensity indicators, such as the min and max values of the spot intensities, distance matrices, histograms of distribution of distances, etc.

Referring more specifically to FIGS. 9 and 10, several images may be obtained for a same relief pattern and then used to obtain a DFP. That is, a relief pattern 40, 41-43 may be optically read S25 multiple times, so as to obtain several images of the same relief pattern. Eventually, the DFP may capture or reflect features detected for each of the images obtained. Such features may be extracted from each image, individually, and then combined. In variants, the images are first combined, whereby the DFP captures features detected from the combined image. Note, these images may first need be registered or aligned to each other, as usual in image processing techniques.

In preferred embodiments, several images are obtained by imaging the relief pattern 40, 41-43 in different lighting conditions. For example, the images may be obtained thanks to different light sources. For example, a LED ring may be used to that aim, whereby rotational illuminations can be achieved, as assumed in FIG. 9. Indeed, the lighting conditions and the camera angle influence the resulting images, which can make the pattern recognition challenging or computationally demanding. Thus, a standalone, low-cost, and portable reader 250 is preferably used, both at steps S11 and S25. In variants, a specific enclosure 251 may be designed, which can be attached to a smartphone camera. Such solutions can be used to image embossed patterns in more controlled conditions, also mitigating effects of stray light.

Figure 9A:
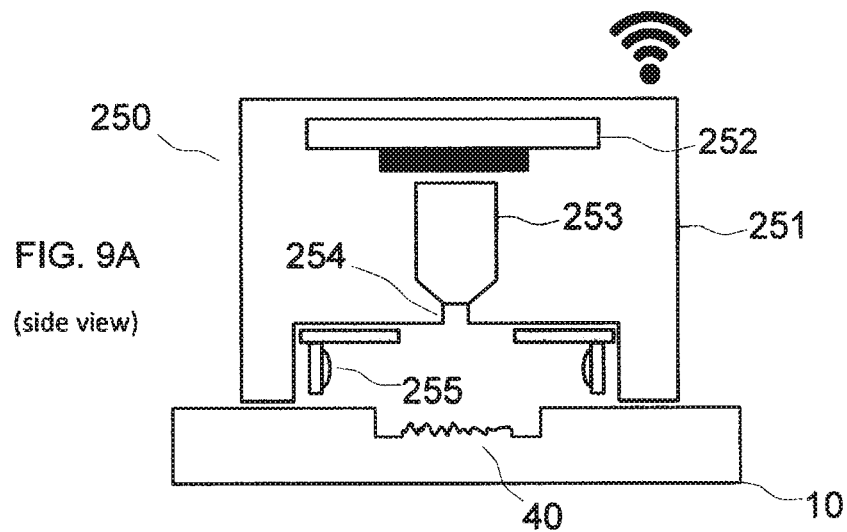
FIG. 9A shows an embodiment of a device for manufacturing items according to the present invention.
Figure 9B:
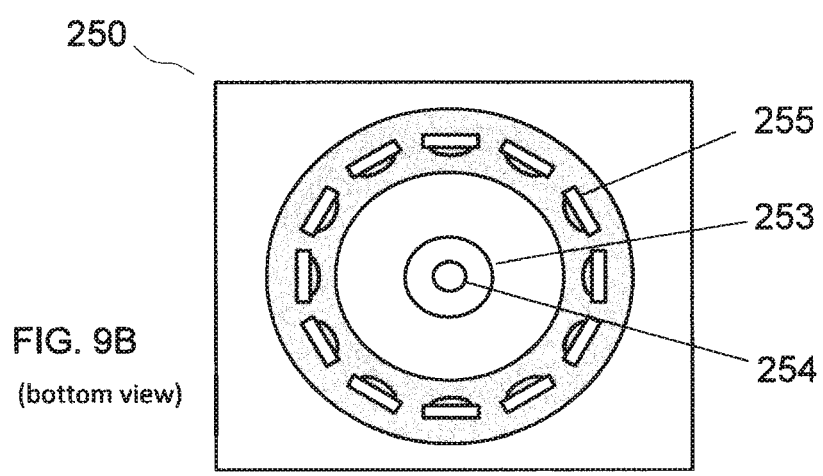
FIG. 9B shows a bottom view of the embodiment of the device of FIG. 9A.

In detail, FIG. 9 depicts a cross-sectional view (FIG. 9A) and a bottom view (FIG. 9B) of a standalone device 250, which comprises an image sensor 252. Note, the housing 251 of the device 250 may possibly be designed as a snap-fit component, which can be attached to a smartphone 200. Thus, the sensor 252 may in fact be a smartphone camera. The device 250 further includes a magnifying objective 253, an aperture 254, and a circular, recessed area, in which a LED ring 255 is arranged. Using a LED ring allows several images to be obtained at different illumination angles, which can be leveraged to more completely characterize each unique relief pattern. In variants, several (distinct) conditions of illumination are relied on, but a same light source is used, though with different angles of illuminations.

Figure 10A:
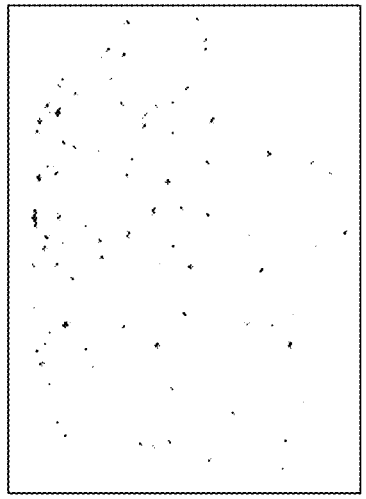
FIG. 10A shows a first image generated by an embodiment of the present invention under a first set of illumination conditions.
Figure 10B:
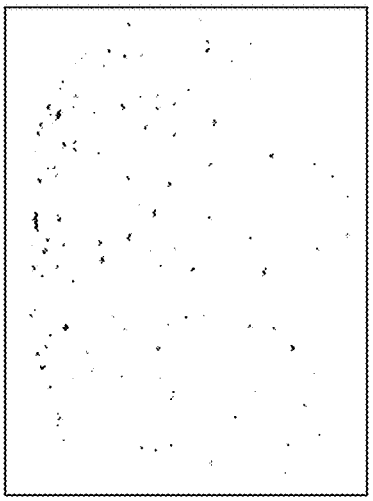
FIG. 10B shows a second image generated by an embodiment of the present invention under a second set of illumination conditions.
Figure 10C:
FIG. 10C shows a third image generated by an embodiment of the present invention under a third set of illumination conditions.

As the present inventors observed, the embossed patterns usually give rise to particularly high-contrast images when imaged in the darkfield. Also, combinations of brightfield imaging and darkfield imaging of the relief pattern can be used. In other variants, images obtained under different wavelengths are used, as illustrated in FIGS. 10A-10C, which respectively correspond to images obtained under red light, green light, and blue light. Such an approach gives rise to distinct numbers of detected spots. In general, using different lighting conditions allows the level of confidence to be drastically increased.

Note, one understands that the DFPs used to perform the comparison S29 should preferably be fault tolerant, to a certain extent, given the possible mismatches between DFPs as respectively obtained at steps S11 and S25. Various possibilities can be contemplated. Euclidian distances may be computed between best matching points of aligned images. There the resulting distances should not exceed a given threshold for the corresponding patterns to be considered a match. In variants, features are extracted from the images obtained and a distance is computed between pairs of images, using unsupervised machine learning techniques. And again, the resulting distance should not exceed a given threshold (which can itself be learned) for the corresponding images to be considered as matching. For example, such distances are computed in a feature space defined by a suitable extractor (for example, using semantic vectors or vectors of pixel values obtained from several images). Large dimensional spaces can be achieved, which may possibly be reduced, using known dimensionality reduction techniques. Then, any suitable distance function may be used, such as the Euclidean distance or the cosine distance, for example.

Barcodes may further be used in addition to scanning the physical fingerprints of the objects, as assumed in FIGS. 11-14. That is, a user 300 may scan S23 a barcode 15 associated to the object 10, see FIG. 12 at reference numeral 44, where the object includes a 2D barcode (which could also be stuck on the object packaging). This way, barcode data is obtained, which captures an identifier 16 of the object 10 (typically a UID). The barcode 15 is scanned prior to transmitting S27 the DFP. Typically, the barcode is scanned using a smartphone that executes a dedicated application. This application first invites the user 300 to scan the barcode, and then prompts the user to scan the relief pattern. Barcode data is then transmitted S27 to the server 110 (for example, together with the DFP or prior to transmitting the latter to the server). The server (or the database 110) may then identify data corresponding to the identifier 16 as DFP reference data and compare S29 the DFP as scanned S25 by the user 300 to such reference data. As said, the database 110 may store DFP reference data indexed by UIDs of the objects and can therefore compare the DFP sent S27 to reference data as indexed by the UIDs. In variants, the application running on the smartphone 200 first instruct to connect to the server, which returns tag information to the smartphone, for the comparison S29 to be performed locally at the smartphone 200.

Figure 12:
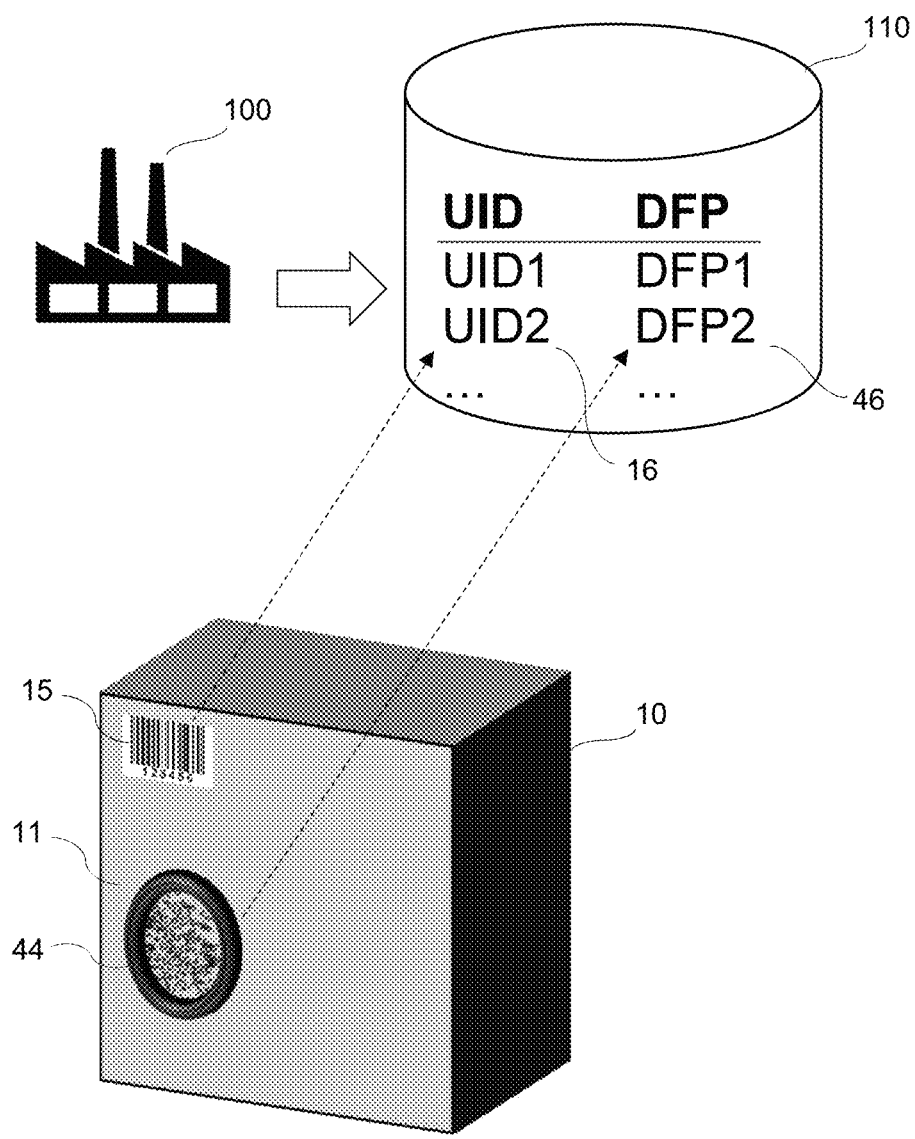
FIG. 12 illustrates how a manufacturer may associate unique identifiers of physical objects with digital fingerprints obtained from physical fingerprints (relief patterns) obtained by mechanically stamping unique features onto this object, as involved in embodiments.

Referring now more specifically to FIGS. 8 and 12, a final aspect of the invention is discussed, which concerns the object 10 itself, as patterned according to the present methods. Characteristics of such objects have already been discussed in reference to other aspects of the invention; they are only briefly discussed in the following.

Namely, the object 10 comprises a surface 11 that is patterned with a relief pattern 40, 41-43. This pattern has been formed according to an arrangement of hard particles 31-33 forming an amorphous pattern, by applying a mechanical pressure on the hard particles 31-33, so as to transfer the amorphous pattern formed by the particles onto the surface 11 of the object. The relief pattern obtained is a tangible feature of the object, which defines a physical fingerprint 40, 41-43 of the object 10. The proposed patterning process gives rise to characteristic, unique features on the surface 11 of the objects, as illustrated in FIGS. 1C, 2C, 3D, 4C, 5C, 6A, 7D, and 8A. The average dimensions of such features are determined by the average size and the areal density of the hard particles. The physical fingerprint, that is, the embossing pattern, can be regarded as a physically unclonable, amorphous pattern that is essentially bidimensional, with small variations perpendicularly to the embossed surface. Such variations are determined by the hard particles (for example, grit particles) and the mechanical pressure process. Residual particles can possibly be found on the surface 11 as well. In all cases, the physical fingerprint obtained can be characterized optically, so as to obtain a DFP of the object 10, which allows a genuineness of this object to be verified.

In embodiments, the relief pattern 40, 41-43 has been formed by stamping the hard particles 31-33 on said surface 11. Such a process also gives rise to a characteristic embossing pattern. The surface 11 may advantageously be defined in a recessed area 12, whereby the relief pattern 40, 41-43 is formed in the surface 11 within the recessed area 12. The object 10 may possibly comprise a protective coating 51, 52 formed on the relief pattern 40, 41-43, wherein the coating is permissive to light. In addition, the relief pattern 40, 41-43 may optionally be partly colorized, so as to exhibit a heterogeneous color pattern.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

Some definitions applicable to certain word, or terms, used in this document are set forth in the following paragraphs.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   for each given object of a plurality of objects:
   creating a pattern on at least one surface of each given object with the creation of the pattern including:
   placing an arrangement of hard particles forming an amorphous pattern adjacent to the at least one surface of the given object,
   applying mechanical pressure on the hard particles to transfer said amorphous pattern onto the at least one surface to form indentations in the at least one surface, with the indentations forming a unique relief pattern on the given object; and
   managing the plurality of objects based, at least in part, upon the unique relief pattern as a physical fingerprint respectively defining each object of the plurality of objects.

2. The method of claim 1 further comprising:
   providing the arrangement of hard particles as part of a support material, wherein the hard particles are affixed to the support material and at least partly protrude from a major surface of the support material;
   wherein the placing the arrangement of hard particles includes placing the major surface of the support material adjacent to the at least one surface so that the at least partially protruding hard particles contact the at least one surface of each given object.

3. The method according to claim 2, wherein the support material and hard particles are in the form of sheet of sandpaper.

4. The method according to claim 1, wherein the application of mechanical pressure includes stamping the hard particles on the at least one surface of the given object of the plurality of objects.

5. The method according to claim 1, wherein:
each object of the plurality of objects defines a recessed area; and
the at least one surface of each given object of the plurality of objects is located in this recessed area.

6. The method according to claim 1 further comprising:
subsequent to the application of mechanical pressure, removing residual hard particles that have been transferred by the application of mechanical pressure to the at least one surface of the given object of the plurality of objects.

7. The method according to claim 1 further comprising:
applying a light permissive, protective coating on the unique relief pattern of the given object.

8. The method according to claim 1, wherein:
the hard particles are at least partially colorized;
the application of mechanical pressure imparts a heterogenous color pattern to the at least one surface of the given object; and
the heterogeneous color pattern helps to uniquely identify each object of the plurality of objects.

9. The method according to claim 1 further comprising:
optically reading the physical fingerprint respectively defining each object of the plurality of objects to obtain a digital fingerprint corresponding to the physical fingerprint.

10. The method according to claim 9 further comprising:
receiving the digital fingerprint corresponding to a first object of the plurality of objects; and
verifying a genuineness of the first object based, at least in part upon a comparison of the digital fingerprint with the physical fingerprint of the first object.

11. A method comprising:
imprinting a pattern of small indentations on a first physical object by pressing, against a set of surface(s) of the first physical object, a plurality of hard particulate objects, with the imprinted pattern representing a physical fingerprint;
scanning the pattern to obtain a digital fingerprint corresponding to the physical fingerprint of the first physical object; and
identifying the first physical object by comparing the physical fingerprint imprinted on the first physical object with the digital fingerprint for the first physical object.

12. The method of claim 11 wherein the plurality of hard particulate objects are grains of sand on a piece of sandpaper.

13. The method of claim 11 wherein the imprinting includes transferring a pattern of different colors to the pattern representing the first physical fingerprint.

14. The method of claim 11 further comprising:
providing an indication that the first physical object is genuine based, at least in part, upon the identification of the first physical object.

15. The method of claim 11 wherein the scanning of the pattern includes optical scanning of the physical fingerprint.

16. A device for use with a physical object that defines a first surface, the device comprising:
a major surface with a plurality of hard particles protruding therefrom in a random pattern;
a physical object securing sub-assembly; and
a mechanical actuation sub-assembly;
wherein:
the physical object securing sub-assembly is structured, sized and/or shaped to mechanically secure the first physical object; and
the mechanical actuation sub-assembly is structured, sized and/or shaped to cause the major surface with the plurality of hard particles protruding therefrom and the first surface of the physical object to move relative to each other into a position of physical interference so that a physical fingerprint pattern corresponding to the random pattern of hard particles is imprinted on the first surface.

17. The device of claim 16 further comprising a scanning sub-assembly structured and connected to:
scan the physical fingerprint pattern imprinted on the first surface; and
generate a digital fingerprint data set including information indicative of a geometry of the pattern imprinted on the first surface.

18. The device of claim 16 wherein the major surface with a plurality of hard particles protruding therefrom includes a piece of sandpaper.

19. A computer program product (CPP) comprising:
a set of storage device(s); and
computer code stored on the set of storage device(s), with the computer code including data and instructions for causing a processor(s) set to perform the following operations:
receiving a plurality of digital fingerprint data sets, with each given digital fingerprint data set including information indicative of: (i) an identity of a respectively corresponding physical object that defines a first set of physical surface(s), and (ii) a digital fingerprint indicative of a geometry of a pattern of small indentations imprinted on the set of surface(s) of the respectively corresponding physical object,
receiving a scan data set including information indicative of a scan of a first set of surface(s) of a first physical object, with the scan indicating a geometry of a pattern of small indentations imprinted into the first set of surface(s),
comparing the scan data set to the plurality of digital fingerprint data sets to determine that the first physical object matches a matching digital fingerprint data set of the plurality of digital fingerprint data sets, and
communicating a communication that indicates that the first physical object has an identity corresponding to the identity indicated in the matching digital fingerprint data set.

20. The CPP of claim 19 wherein the pattern of small indentations is made by pressing a piece of sandpaper against the first set of surface(s) of the first physical object.

21. An object comprising a surface patterned with a relief pattern that has been formed according to an arrangement of hard particles forming an amorphous pattern and by applying a mechanical pressure on the hard particles to transfer said amorphous pattern onto said surface, whereby the relief pattern defines a physical fingerprint of the object.

22. The object according to claim 21, wherein
the relief pattern has been formed by stamping the hard particles on said surface.

23. The object according to claim 21, wherein
said object comprises a recessed area,
said surface is defined in the recessed area, and
the relief pattern is formed on the surface within the recessed area.

24. The object according to claim 21, wherein
the object further comprises a protective coating on the relief pattern, wherein the coating is permissive to light.

25. The object according to claim 21, wherein
the relief pattern is partly colorized, so as to exhibit a heterogeneous color pattern.

* * * * *